US012584568B2

(12) United States Patent
Kwon et al.

(10) Patent No.: US 12,584,568 B2
(45) Date of Patent: Mar. 24, 2026

(54) FLUID PRESSURE REDUCING DEVICE

(71) Applicant: YPP CORPORATION, Seoul (KR)

(72) Inventors: Kab Ju Kwon, Daejeon (KR); Min Wong Hwang, Changwon-si (KR)

(73) Assignee: YPP CORPORATION, Seoul (KR)

( * ) Notice: Subject to any disclaimer, the term of this patent is extended or adjusted under 35 U.S.C. 154(b) by 0 days.

(21) Appl. No.: 18/571,112

(22) PCT Filed: Oct. 25, 2022

(86) PCT No.: PCT/KR2022/016389
§ 371 (c)(1),
(2) Date: Dec. 15, 2023

(87) PCT Pub. No.: WO2024/080430
PCT Pub. Date: Apr. 18, 2024

(65) Prior Publication Data
US 2025/0237323 A1      Jul. 24, 2025

(30) Foreign Application Priority Data
Oct. 11, 2022      (KR) ........................ 10-2022-0133092

(51) Int. Cl.
*F16K 47/08*          (2006.01)
*F16K 47/04*          (2006.01)
(52) U.S. Cl.
CPC .............. *F16K 47/08* (2013.01); *F16K 47/04* (2013.01)

(58) Field of Classification Search
CPC .... F16K 47/08; F16K 47/04; F16L 55/07236; F16L 55/0279; F16L 55/02727; F16L 55/02718
See application file for complete search history.

(56) References Cited

U.S. PATENT DOCUMENTS

| | | | |
|---|---|---|---|
| 5,819,803 A | 10/1998 | Lebo et al. | |
| 7,690,400 B2 * | 4/2010 | Haines | F16K 47/08 |
| | | | 138/40 |
| 9,528,632 B2 * | 12/2016 | Glaun | B33Y 80/00 |
| 10,758,849 B2 * | 9/2020 | Richardson | B01D 29/46 |

FOREIGN PATENT DOCUMENTS

| | | |
|---|---|---|
| JP | 11-248032 A | 9/1999 |
| KR | 10-1233653 B1 | 2/2013 |
| KR | 10-2013-0034671 A | 4/2013 |
| KR | 10-1889938 B1 | 8/2018 |

* cited by examiner

*Primary Examiner* — Michael R Reid
(74) *Attorney, Agent, or Firm* — Heedong Chae; Lucem, PC

(57) ABSTRACT
The present invention relates to a device that is provided inside a valve (10) to control a flow of a fluid. More specifically, the present invention relates to a device that is installed inside a valve (10) to reduce a pressure and speed to lower the fluid pressure and speed at a side of a second port (510) by suppressing a flow of a high-pressure fluid at a side of a first port (410) under a condition of a large difference in fluid pressure between a fluid pressure at an inlet of the valve (10) and the fluid pressure at an outlet of the valve (10).
The present invention relates to a device for preventing damage to a plug (13) due to a fluid colliding toward the plug (13) inside the valve (10).

4 Claims, 10 Drawing Sheets

(A)                        (B)

(A)                            (B)

(disk A)                    (disk B)

510

410

100

200

(in) Enlarged view (out) Enlarged flow view

FLUID PRESSURE REDUCING DEVICE

TECHNICAL FIELD

The present invention relates generally to a device that is installed inside a valve to control a pressure of a fluid. More specifically, the present invention relates to a device for reducing a pressure and speed to lower the fluid pressure and speed at an outlet side by suppressing a flow of a high-pressure fluid under a condition of a large difference in fluid pressure between a fluid pressure at an inlet side and the fluid pressure at the outlet side.

BACKGROUND ART

In general, a piping facility uses a valve to block a flow of a fluid passing through a pipe or to adjust a flow rate of the fluid. In order to increase a transfer driving force and efficiency of the fluid from one end to the other end of the pipe, the piping facility has a high fluid pressure from one end of the pipe using a power device, such as a pump in case of a liquid and a compressor in case of a gas. Accordingly, the fluid is transferred at a high-speed using the high pressure. However, when the fluid is transferred at an excessively high speed, vibration and noise are generated, resulting in water hammering and cavitation in a curved pipe part. Therefore, the piping facility is generally designed such that a flow velocity of gas is 75 m/s or less and a flow velocity of liquid is 5 m/s or less.

Among the valves for counting or adjusting a flow rate of the fluid in the piping facility, a control valve is a valve that controls the flow rate of the fluid and adjusts the flow rate by moving a plug forward and backward. In general, a valve operated under a high-pressure condition has a fluid pressure division device (that is, referred to as a fluid pressure reducing device or a case) provided around the plug-in order to easily adjust the flow rate using the plug. The position of the plug moves forward and backward to adjust the flow rate of the fluid passing through the fluid pressure reducing device, thereby adjusting the entire flow rate of the fluid passing through the valve.

The fluid pressure reducing device is provided between an inlet through which a high-pressure fluid is introduced and an outlet through which the fluid is discharged in a low-pressure state to adjust the flow rate of the valve and reduce the pressure of the fluid. The value includes a body, a fluid pressure reducing device mounted inside the body, and a plug moving forward and backward along an inner circumferential surface of the fluid pressure reducing device. The plug moves forward and backward along the inner circumferential surface of the fluid pressure reducing device, thereby serving to open and close the flow of the fluid at an outlet side of the fluid pressure reducing device. In particular, resistance is provided to a flow of the fluid between an inlet through which hundreds of bars of the high-pressure fluid flows and an outlet through which the fluid flows in a low-pressure state such as atmospheric pressure, thereby inducing pressure reduction of the fluid.

However, high kinetic energy of the fluid generated due to pressure drop in the valve causes problems such as cavitation, flashing, noise, and vibration. As a result, the fluid pressure reducing device, the seat ring, the plug, and the like, which are main components of the valve, are damaged.

In general, when the pressure of the fluid at the inlet side is low, the fluid pressure reducing device has a hole through which the fluid may directly communicate, and has a structure in which when the pressure difference is large due to the high inlet pressure and the low outlet pressure of the fluid, a direction of a flow path of the fluid pressure reducing device is changed in order to reduce the pressure and speed of the fluid.

A fluid pressure reducing device, which has a structure with a zigzag flow path or a structure in which a flow path repeats contraction, expansion, and vortex when there is a large difference in pressure between the inlet and the outlet of the valve, is disclosed as a conventional technology.

In the related art 1 of Korean Registered Patent 10-1233653 (a device for reducing the pressure and speed of a flowing fluid), disks having through-holes are stacked in a direction of a central shaft, and the stacked disks have a right-angled through-hole formed in the disks so as to form flow paths between the stacked disks, and the flow paths communicate with the right-angled through-hole of another adjacent disk.

FIG. 1(A) is a sectional view of a valve 10 in a state in which the fluid pressure reducing device of the present invention is mounted, and FIG. 1(B) is a perspective view of a basic configuration of the conventional fluid pressure reducing device. The fluid pressure reducing device 20 is installed inside the valve 10 which is a kind of a fluid treatment device. The valve 10 includes: a body having an inlet 11a and an outlet 11b; a fluid pressure reducing device 20 installed inside the body 11; a plug 13 moving forward and backward so as to make contact with an inner circumferential surface of the fluid pressure reducing device 20, and connected to a stem to adjust a flow rate of the fluid between the inlet 11a and the outlet 11b; and a seat ring 14 making close contact with the body 11 and the plug 13 to block the flow of fluid.

Meanwhile, directions of the inlet and the outlet in the valve may be changed according to characteristics of the valve 10 and a type of fluid used. In addition, the flow rate of the fluid flowing through the valve 10 is adjusted as the plug 13 connected by the stem 12 moves forward and backward along an inner diameter of the fluid pressure reducing device 20. When the plug 13 moves upward as shown on the right side with respect to the center line of FIG. 1(A), the flow rate increases by opening the flow path, and when the plug 13 moves downward as shown on the left side with respect to the center line of FIG. 1(A), the flow rate decreases by closing the flow path.

FIG. 1(B) is a view showing an example of the conventional fluid pressure reducing device 20. The fluid pressure reducing device has a shape with a predetermined thickness by stacking a plurality of disks having central holes 25 at the center thereof, and a cover plate 26 is disposed on each of the rightmost disk and the leftmost disk. The fluid pressure reducing device including the plurality of disks 21 is integrally coupled through welding, pins, bolts, or brazing. In addition, since pattern holes are formed in each disk to have a predetermined pattern, the fluid pressure reducing device formed by the plurality of stacked disks has flow paths formed by the pattern holes which are repeatedly formed, in which the flow paths are radially formed between an outer circumferential surface and an inner circumferential surface of the central hole 25.

To describe in more detail with reference to FIG. 1(B), the fluid pressure reducing device 20 includes a plurality of first pattern holes 23, 24 radially formed in the first disk 21, and a plurality of second pattern holes radially formed in the second disk. The first disk and the second disk are stacked such that the first pattern hole and the second pattern hole radially form a flow path 22, and different disks are stacked on each outer side of the first disk and the second disk, in which a surface in which the pattern hole is not formed is stacked by a predetermined angle. However, since this structure has a shape in which fluid resistance of the flow path is generated while the flow path is changed to a right-angled direction, the fluid resistance of the flow path for pressure reduction is small, so that there is a disadvantage in that a device has to be made large in order to make a reduced pressure and flow velocity.

The related art 2 of Korean Registered Patent No. 10-1513328 (direct metal laser sintered flow control element) relates to a flow control element including an element body, which includes a bore formed therethrough and defines an inner circumferential surface, in which a flow path is provided repeatedly so as to be twisted in a direction perpendicular to a plane, thereby forming fluid resistance of the flow path. Thus, as in the related art 1, since the fluid resistance of the flow path is small, a device needs to be largely manufactured in order to obtain a desired reduced pressure and flow velocity, and manufacturing time and manufacturing costs are largely required due to sintering of powdered material.

In the related art 3 of Korean Registered Patent No. 10-2139969, a method is used in which a fluid introduced into a vortex hole of a disk repeats a process in which the fluid is introduced into the vortex hole of an adjacent disk through a slit, thereby generating a vortex of the fluid introduced into the vortex hole and decreasing a flow velocity. This device repeats the diffusion of the fluid from the slit forming the flow path to a circular hole, and in order to obtain a desired level of flow resistance due to small fluid resistance to the fluid, several slits and vortex holes need to be formed, and thus the device needs to be manufactured largely.

FIG. 2(A) is a photograph showing a state of damage to a plug due to collision with the fluid in a fluid pressure reducing device in which the plug is combined. As shown in FIG. 2(B), the plug damage is generated as the plug moves forward and backward while making close contact with the inner circumferential surface of the fluid pressure reducing device, thereby opening and closing the outlet of the fluid pressure reducing device, and the fluid introduced into the inlet of the valve body is discharged toward the plug of the inner circumferential surface of the fluid pressure reducing device along the inlet, the pressure reduction flow path, and the outlet of the fluid pressure reducing device. When the outlet of the fluid pressure reducing device is located below the lower end of the plug, the fluid passes through the seat ring through the outlet of the fluid pressure reducing device and flows to the outlet. When the outlet of the fluid pressure reducing device faces the outer circumferential surface of the plug, the fluid passing through the fluid pressure reducing device collides with the circumferential surface of the plug at the outlet of the fluid pressure reducing device and flows in a lower end direction of the circumferential surface of the plug through a gap with the plug. The flow velocity at which the fluid passes through the gap varies depending on the position of the plug with respect to the fluid pressure reducing device. This is due to the length and resistance of the flow path through which the fluid may flow. In the outlet of the fluid pressure reducing device, the flow velocity becomes higher at the lower side than at the upper side.

In this case, since a space between the fluid pressure reducing device and an inclined surface of the lower end of the plug is gradually expanded downward, a flow velocity of the fluid at an expanded space is much higher than a flow velocity of the fluid at a narrow space. This is because the pressure in the space expansion portion decreases and the flow velocity increases. As it goes downward along the inclined surface of the lower end of the plug, the speed of the fluid is greatly increased and the magnitude of the impact is greater at the lower portion of the inclined surface of the lower end of the plug. Accordingly, the erosion part by the fluid is largely formed toward the lower portion of the inclined surface of the plug. Therefore, the erosion of the inclined surface of the plug may be prevented only when the speed of the fluid discharged from the fluid pressure reducing device is lowered.

As described above, the conventional fluid pressure reducing device has a disadvantage in that the fluid resistance of the flow path is small and the device needs to be largely manufactured. In order to improve the limitations of the related art, the present inventors conceive a fluid pressure reducing device having an increased pressure reducing effect by using a unit module in which diffusion, recirculation, collision, rapid reduction, and rapid change of direction of a fluid occur simultaneously.

DISCLOSURE

Technical Problem

An object of the present invention is to provide a fluid pressure reducing device including a unit of a flow path capable of significantly increasing fluid resistance of the flow path even in a small area.

Specifically, another object of the present invention is to provide a fluid pressure reducing device which effectively increases resistance of a flow path within a predetermined volume such that a flow velocity of a gap between the fluid pressure reducing device and a plug is not excessively increased due to a high differential pressure that is applied between an inlet side and an outlet side of the fluid pressure reducing device.

Technical Solution

To solve the above technical problems, a fluid pressure reducing device of the present invention is a fluid pressure reducing device that is mounted in a fluid treatment device including an inlet pipe 11a through which a high-pressure fluid is introduced and an outlet pipe 11b through which a low-pressure fluid is discharged, to induce fluid pressure reduction, the fluid pressure reducing device comprising:

an annular disc A (100) having an outer diameter and an inner diameter; and an annular disk B (200) configured to have an outer diameter and an inner diameter, which are the same as the outer diameter and the inner diameter of the disk A, wherein the disk A (100) and the disk B (200) are coupled to each other as a pair of disks, and a plurality of pairs thereof overlap each other, wherein a plurality of diffuser cells having a trapezoidal shape of a narrow top and a wide bottom are formed from an outer circumferential surface (400) to the inner circumferential surface (500) so as to stand upright, so that a diffuser a (110) is radially formed in the disk A (100), a plurality of diffuser cells having a trapezoidal shape are formed from the outer circumferential surface (400) to the inner circumferential surface (500) so as to be perpendicular to a radial direction, so that a diffuser b (210) is formed in the disk B (200), wherein the disk A (100) and the disk B (200) are concentrically coupled to each other so that the diffuser a (110) crosses the diffuser b (210), thereby forming a pressure reduction flow path, and
wherein a plurality of sets of the disk A and the disk B are integrally coupled to each other.

Advantageous Effects

According to the fluid pressure reducing device of the present invention, by simultaneously and repeatedly performing the diffusion flow in which the fluid is diffused through the enlarged side surface of the diffuser cell in the pressure reduction flow path formed by each diffuser cell, the recirculation flow at the lower end part of the side surface, the collision flow with the bottom surface, the rotation flow generated thereafter, the rapid reduction to the direction changing portion W, and the rapid direction change to the upper layer or the lower layer, it is possible to significantly enhance an effect of reducing the pressure of the fluid.

The fluid pressure reducing device of the present invention includes a fluid diffusing structure at the outlet as an outlet so as to significantly reduce the pressure and speed of the fluid, and can reduce the impact when the fluid collides with the circumferential surface of the plug, thereby preventing erosion of the circumferential surface of the plug and precisely controlling opening/closing of the outlet by the plug.

Figure 1:
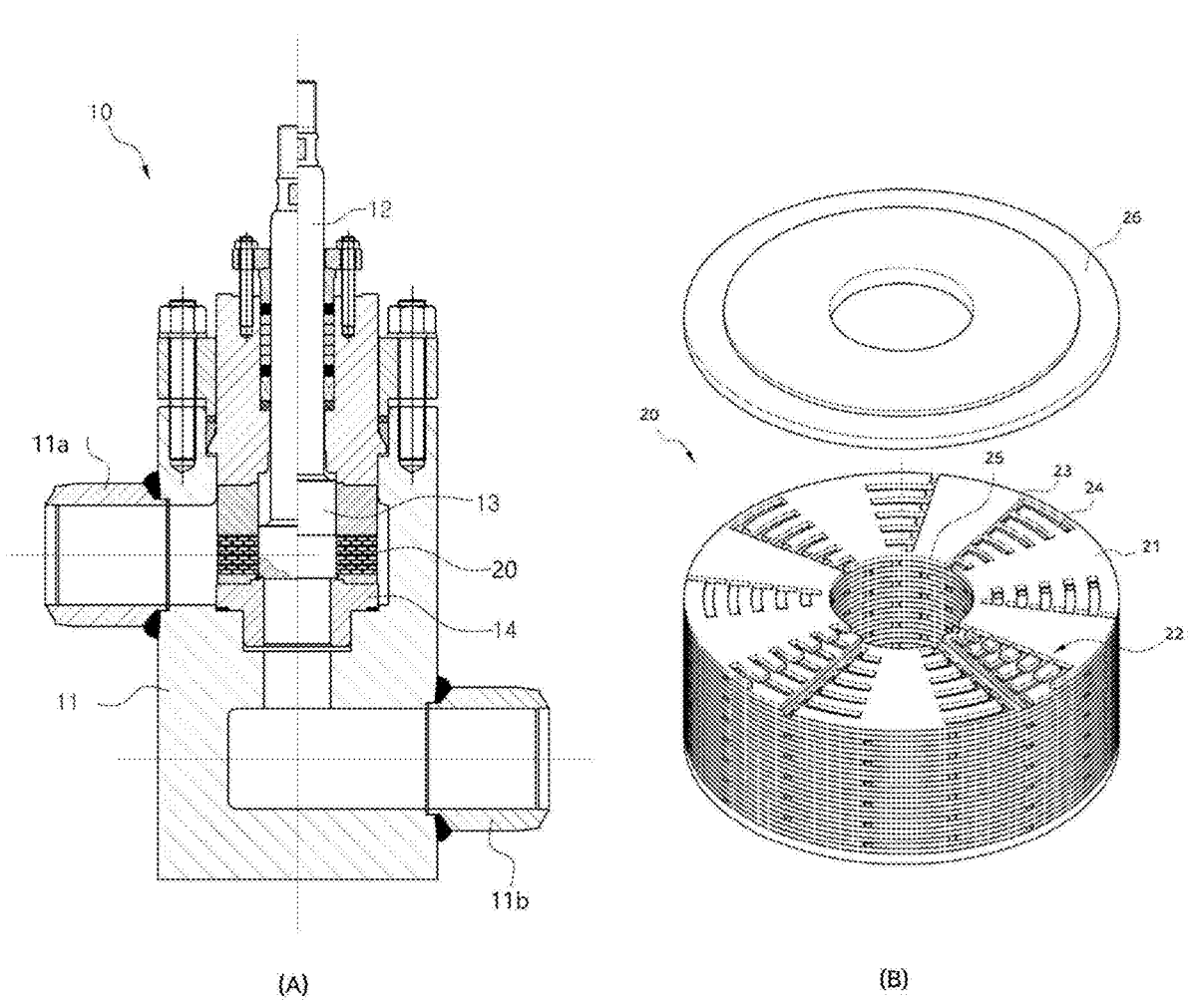
FIG. 1 is a view showing an example of a valve mounted with a conventional fluid pressure reducing device and an example of the fluid pressure reducing device.
Figure 2:
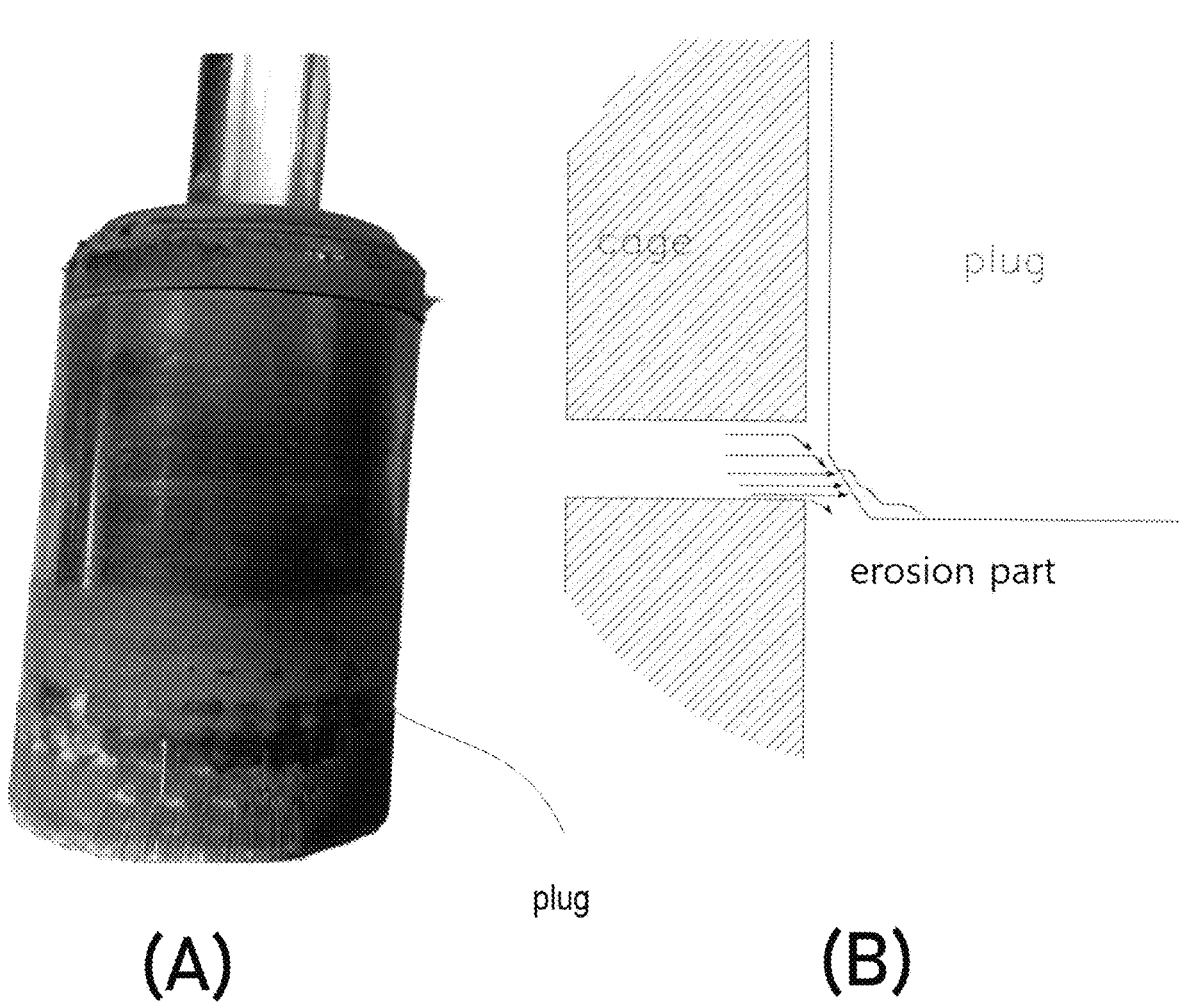
FIG. 2 is a photograph of general damage to a plug in the fluid pressure reducing device and a conceptual view of a fluid flow near the plug.

100: disk A, 110: diffuser a, 111: upper open cell a,
112: closed cell a-1, 113: closed cell a-2, 114: lower open cell a
200: disk B, 210: diffuser b
211: closed cell b-1, 212: closed cell b-2,
400: outer circumferential surface, 410: first port
500: inner circumferential surface, 510: second port

MODE FOR INVENTION

Hereinafter, a pressure reducing apparatus for flowing a fluid according to the present invention will be described with reference to the accompanying drawings. In the following embodiments, the fluid pressure reducing device embedded in the valve 10 as a fluid treatment device is described by way of example, but the present invention is not limited to a valve 10 and also includes a case of another device with a condition in which a high pressure is applied to a side of an inlet pipe 11a and a side of an outlet pipe 11b.

The present invention relates to a fluid pressure reducing device that is mounted in a fluid treatment device including an inlet pipe 11a through which a high-pressure fluid is introduced and an outlet pipe 11b through which a low-pressure fluid is discharged, to induce fluid pressure reduction. A fluid pressure reducing device according to a first embodiment of the present invention shown in FIG. 3 includes a pair of an A-type disk A and a B-type disk B. The disk described in the present invention is an annular disk having an outer diameter and an inner diameter, in which a plurality of diffuser cells is formed on the disk in a direction from the outer diameter to the inner diameter to form diffusers in a row. According to the present invention, the outer diameter is referred to as an outer circumferential surface 400, the inner diameter is referred to as an inner circumferential surface 500, the direction toward the outer circumferential surface 400 is referred to as an upper portion or an upper direction, and the direction toward the inner circumferential surface 500 is referred to as a lower portion or a lower direction.

Specifically, the fluid pressure reducing device according to the first embodiment of the present invention is, a fluid pressure reducing device that is mounted in a fluid treatment device including an inlet pipe 11a through which a high-pressure fluid is introduced and an outlet pipe 11b through which a low-pressure fluid is discharged, to induce fluid pressure reduction, the fluid pressure reducing device comprising:

an annular disc A 100 having an outer diameter and an inner diameter; and an annular disk B 200 configured to have an outer diameter and an inner diameter, which are the same as the outer diameter and the inner diameter of the disk A, wherein the disk A 100 and the disk B 200 are coupled to each other as a pair of disks, and a plurality of pairs thereof overlap each other, wherein a plurality of diffuser cells having a trapezoidal shape of a narrow top and a wide bottom are formed from an outer circumferential surface 400 to the inner circumferential surface 500 so as to stand upright, so that a diffuser a 110 is radially formed in the disk A 100, a plurality of diffuser cells having a trapezoidal shape are formed from the outer circumferential surface 400 to the inner circumferential surface 500 so as to be perpendicular to a radial direction, so that a diffuser b 210 is formed in the disk B 200, and wherein the diffuser a 110 and the diffuser b 210 are concentrically coupled to each other, so that the diffuser a 110 crosses the diffuser b 210, thereby forming a pressure reduction flow path, in which a plurality of sets of the disk A and the disk B are integrally formed.

Figure 3:
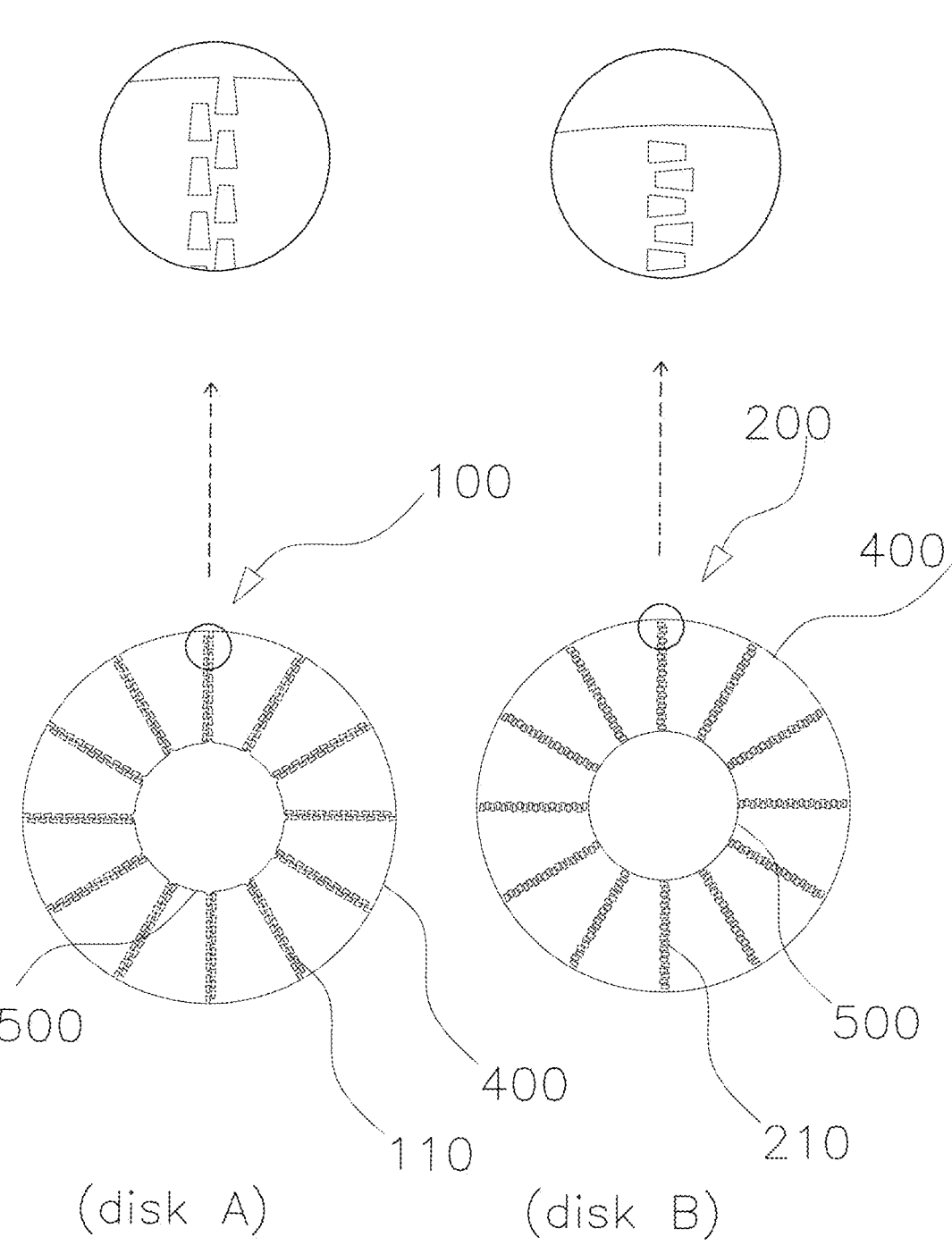
FIG. 3 is a view showing a diffuser structure formed on a disk A and a disk B according to a first embodiment of the present invention.

As shown in the enlarged view of FIG. 3, both the disk A 100 and the disk B 200 have a structure in which a diffuser cell is formed in a disk plate in the form of a through-hole, and the diffuser a and the diffuser b are radially formed. That is, according to the present invention, the diffuser cell has a trapezoidal shape, and in the following description, a narrow width part of the trapezoidal shape is referred to as an upper surface, a wide width part of the trapezoidal shape is referred to as a side surface, an inclination surface of the trapezoidal shape is referred to as a side surface.

Figure 4:
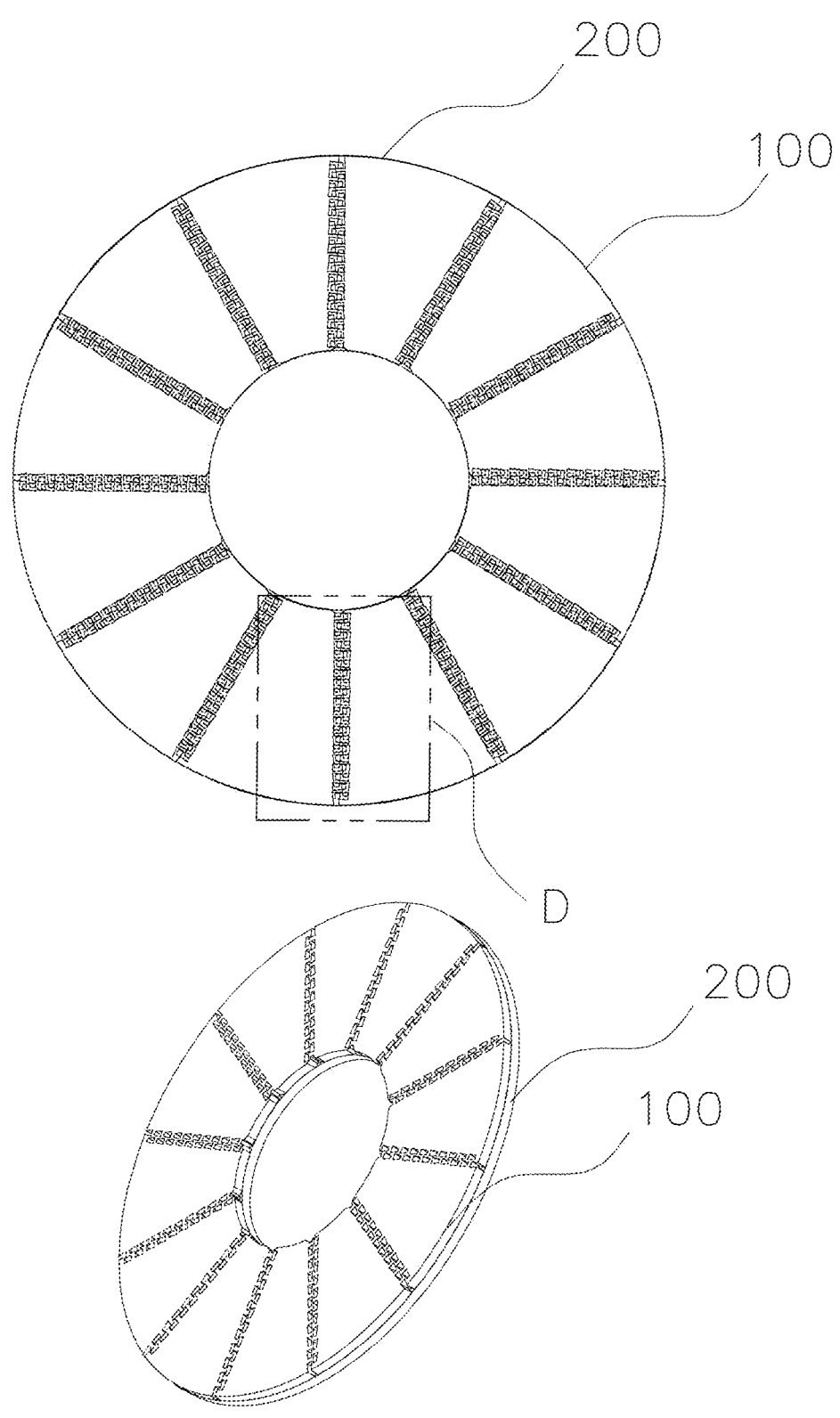
FIG. 4 is a view showing a combination of the disk A and the disk B according to the first embodiment of the present invention.
Figure 5:
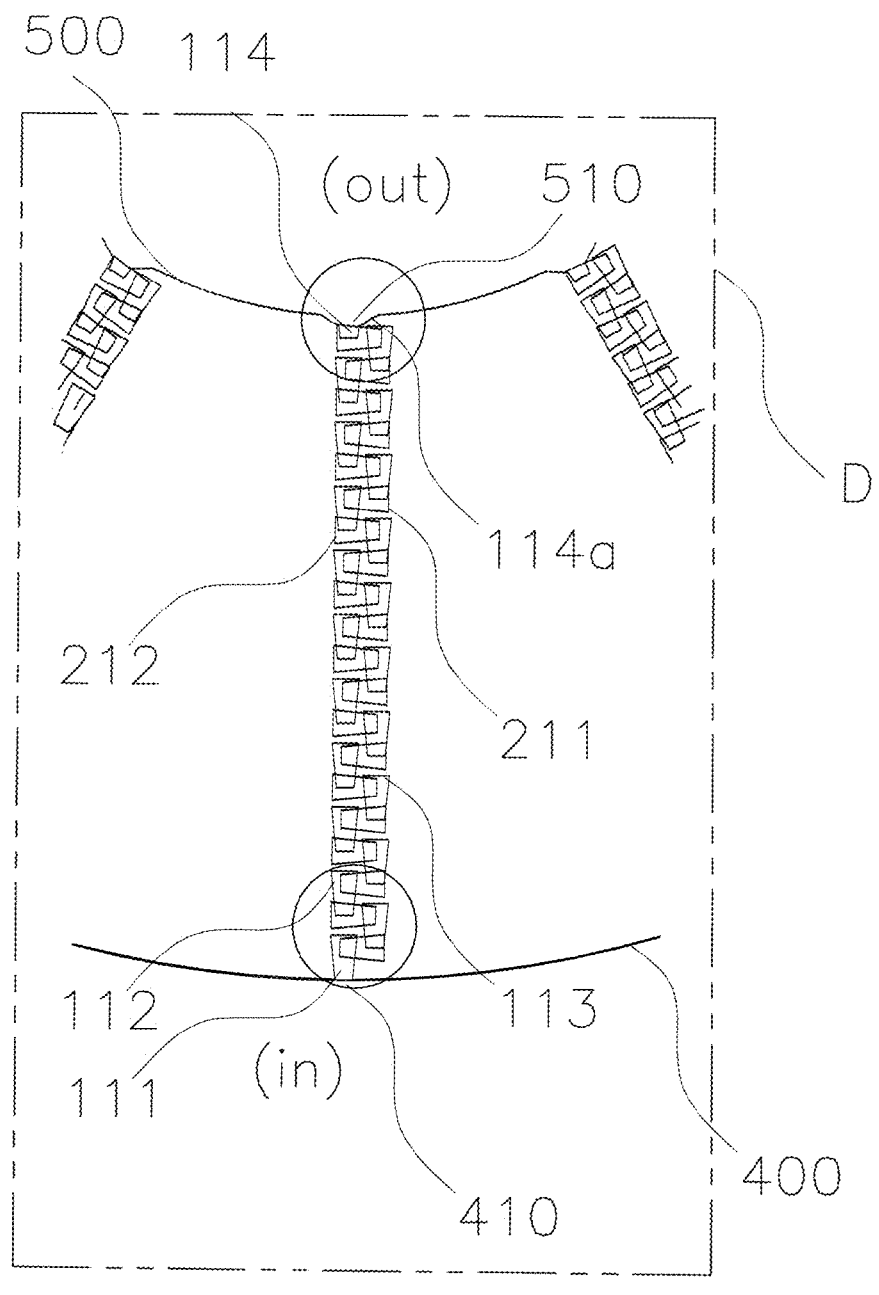
FIG. 5 is a partial enlarged view of FIG. 4.

The disk A 100 and the disk B 200 have a plurality of diffuser cells having mutually different shapes while being spaced apart from each other, and when the disk A 100 concentrically overlaps the disk B 200, the diffuser a 110 of the disk A 100 partially overlaps the diffuser b 210 of the disk B 200, so that a flowing direction of the fluid is changed between an upper layer and a lower layer, thereby forming a pressure reduction flow path through which a high-pressure fluid may flow. FIG. 5 is a partial enlarged view of D in FIG. 4.

Specifically, as shown in FIG. 5, the diffuser a 110 of the disk A 100 includes:

an upper open cell a 111 provided adjacent to the outer circumferential surface 400 of the disk A 100 and having a trapezoidal shape with a narrow upper end that is open so as to form a first port 410 as an inlet (in) of the fluid;

a lower open cell a 114 provided adjacent to the inner circumferential surface 500 of the disk A 100 and having a trapezoidal shape with a wide lower end that is open so as to form a second port 510 as an outlet (out) of the fluid; and at least one or more closed cells a-1 112 and closed cells a-2 113 having a trapezoidal shape, which are provided in two rows between the upper open cell a 111 and the lower open cell a 114 at predetermined intervals, in which heights of a row of the closed cell a-2 113 and a row of the closed cell a-1 112 are offset from each other.

In addition, the diffuser b 210 of the disk B 200 including a plurality of diffuser cells, includes:

a plurality of closed cell b-1 211 and a plurality of closed cell b-2 212 having trapezoidal shapes, which are provided between the outer circumferential surface 400 and the inner circumferential surface 500 of the disk B 200 and are formed in a direction from the outer circumferential surface to the inner circumferential surface at predetermined intervals, in which the closed cell b-1 211 and the closed cell b-2 212 are formed in a direction perpendicular to a direction in which the diffuser cell of the diffuser a 110 is formed, and directions in which the trapezoidal shapes of the closed cell b-1 211 and the closed cell b-2 212 are sequentially reversed.

In summary, the fluid pressure reducing device of the present invention is, a fluid pressure reducing device that is mounted in a fluid treatment device including an inlet pipe 11a through which a high-pressure fluid is introduced and an outlet pipe 11b through which a low-pressure fluid is discharged, to induce fluid pressure reduction, the fluid pressure reducing device comprising:

an annular disc A 100 having an outer diameter and an inner diameter; and an annular disk B 200 configured to have an outer diameter and an inner diameter, which are the same as the outer diameter and the inner diameter of the disk A, wherein the disk A 100 and the disk B 200 are concentrically coupled to each other as a pair of disks, and one or more pairs thereof overlap each other, wherein a plurality of diffuser cells having a trapezoidal shape stand upright, that is, are formed parallel to a radial direction from an outer circumferential surface 400 to an inner circumferential surface 500, so that a diffuser a 110 is radially formed in the disk A 100 in two rows, a plurality of diffuser cells having a trapezoidal shape are formed from the outer circumferential surface 400 to the inner circumferential surface 500 in a direction perpendicular to the diffuser cell of the diffuser a 110, and a diffuser b 210 is radially formed in the disk B 200, in which the diffuser cells are alternately formed in a direction opposite to each other, and the disk A 100 and the disk B 200 are concentrically coupled to each other so that the diffuser a 110 crosses the diffuser b 210, thereby allowing the diffuser a 110 and the diffuser b 210 to be vertically connected to each other in order to form a pressure reduction flow path.

Therefore, the respective diffuser cells of the diffuser a 110 are arranged such that the upper surface of the trapezoidal shape faces the outer circumferential surface with a narrow width, and the lower surface thereof faces the inner circumferential surface with a wide width, and the respective diffuser cells of the diffuser b 210 are formed such that the upper surfaces of the trapezoidal shape lying in a right direction and a left direction are alternately provided.

The disk A 100 and the disk B 200 are concentrically coupled to each other such that the diffuser cell of the disk A vertically and partially overlaps the diffuser cell of the disk B 200, in order to form a pressure reduction flow path in a direction from the outer circumferential surface 400 to the inner circumferential surface 500. That is, the disk A 100 and the disk B 200 are concentrically coupled to each other so that the diffuser a 110 crosses the diffuser b 210, thereby allowing the diffuser a 110 and the diffuser b 210 to be vertically connected to each other in order to form a pressure reduction flow path, and the coupling of such a structure is formed in a plurality of sets, so that a fluid pressure reducing device having a multi-layer structure is formed as shown in FIG. 6.

Figure 6:
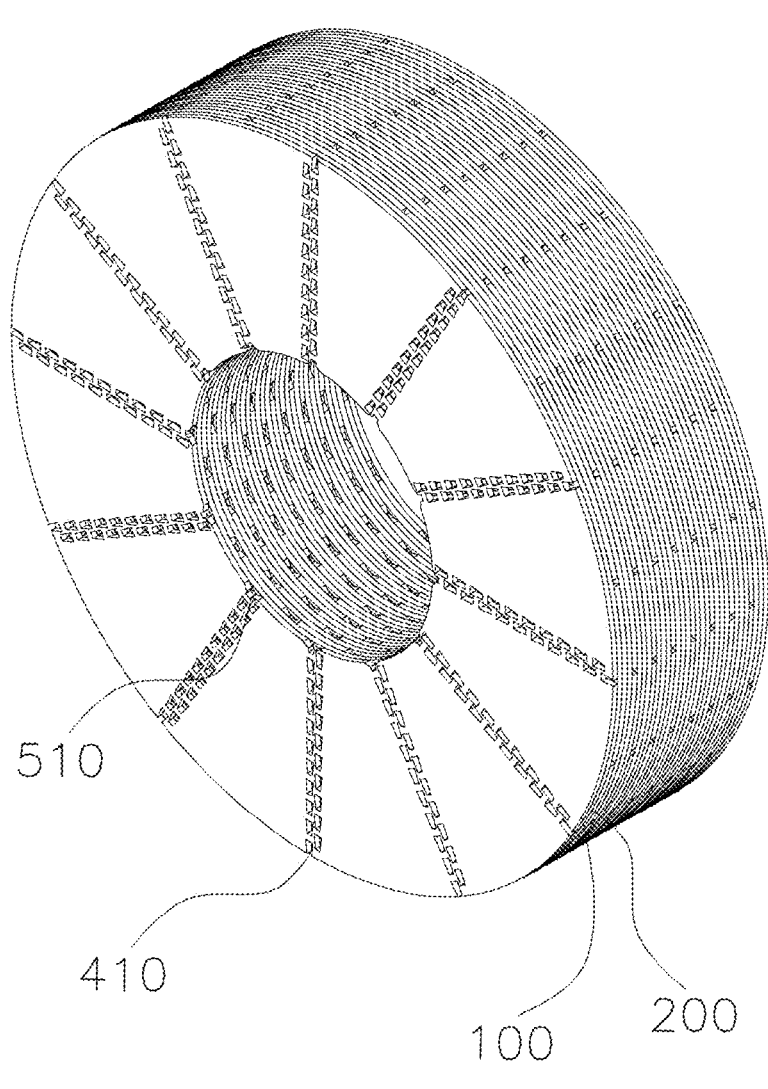
FIG. 6 is an exemplary view of the fluid pressure reducing device according to the first embodiment of the present invention.

As shown in FIG. 6, the disk A and the disk B are formed in a pair, and a plurality of pairs thereof overlap each other to form the fluid pressure reducing device, in which a first port is provided in the outer circumferential surface as an inlet through which the fluid is introduced, and a second port is provided in the inner circumferential surface as an outlet through which the fluid is discharged. In a state in which the disks A and B overlap each other, each of the diffuser cells forms a flow path through which the fluid alternately flows the diffuser cell of the disk A and the diffuser cell of the disk B up and down. Obviously, since the disk A 100 alternately overlaps the disk B 200, a first set of disks overlaps at the same diffuser angle, but a second set of another pair of adjacent disks overlaps at an angle spaced apart from the first set. Accordingly, since the first set of disks overlaps at an angle at which both side surfaces are spaced apart from each other by the second set of adjacent disks and a third set of disks, upper and lower portions of the flow path formed of the diffusers is blocked.

Figure 7:
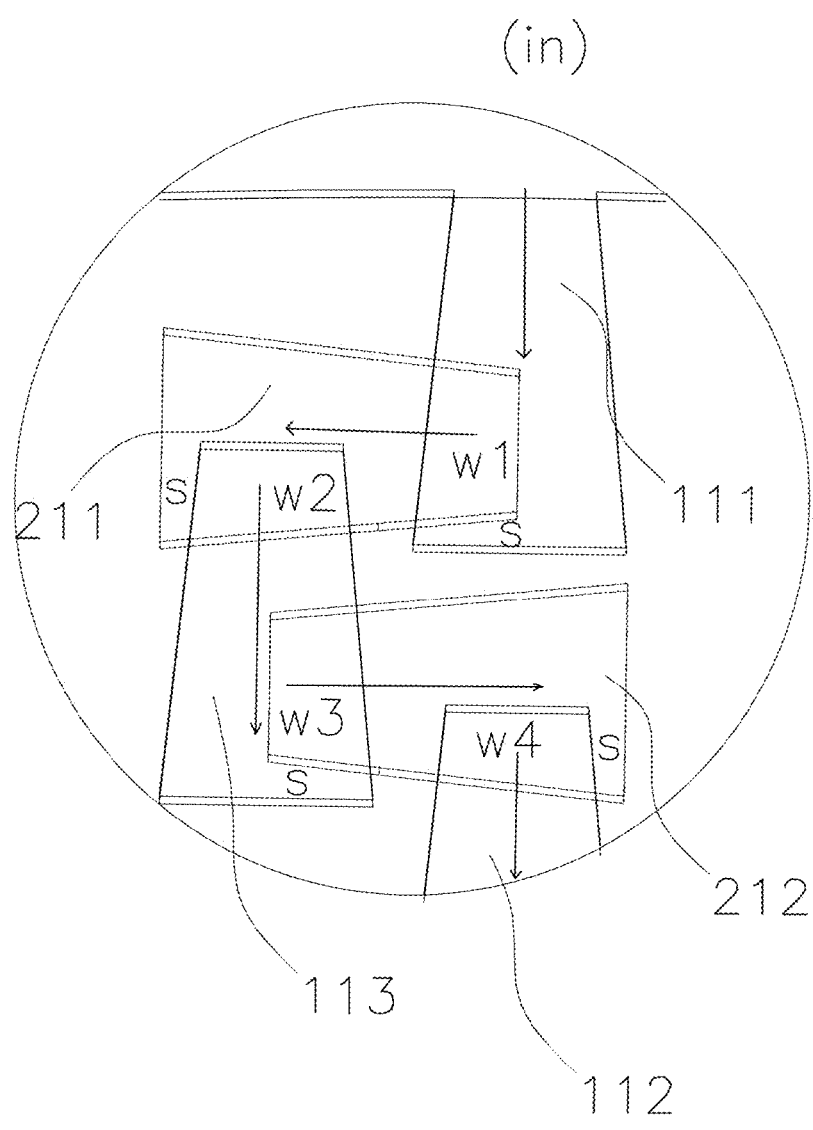
FIG. 7 is a view showing an enlarged and coupled diffuser cell according to the first embodiment of the present invention.
Figure 8:
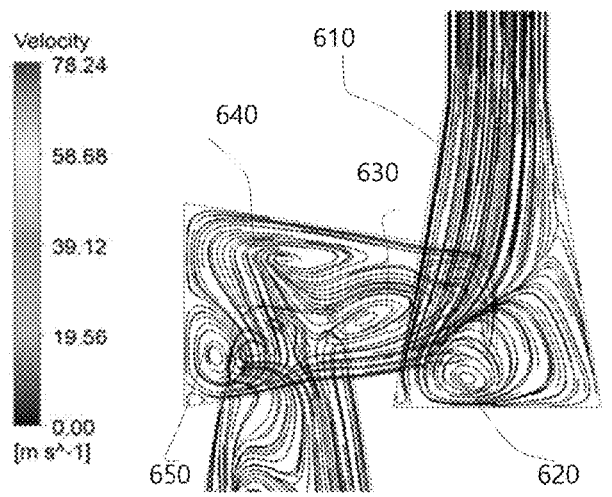
FIG. 8 is a view showing a simulation of a flow at an inlet and a pressure reduction flow path according to the first embodiment of the present invention.
Figure 8:
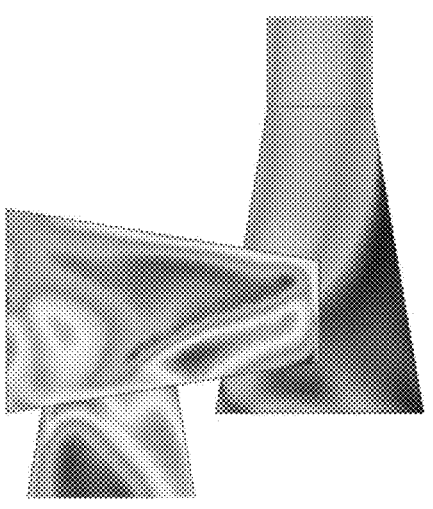

That is, FIG. 7 is an enlarged view of a first port (in) of FIG. 5, that is, an inlet portion, and FIG. 8 is a view showing a simulation of a flow of the fluid at the first port portion. Through the diffuser cell shown in FIG. 7 and the flow thereof, the fluid passes through the diffuser cell of the disk A to flow while changing a direction to the diffuser cell of the disk B, and the flow changes back to the diffuser cell of the disk A. In particular, the fluid, which is introduced through an upper end while passing through the trapezoidal diffuser cell, diffuses along the enlarged side surface to increase resistance, and the fluid strongly collides with a bottom surface to generate resistance. The fluid rapidly changes the direction up and down from a direction changing portion, which is an overlapping portion of the diffuser cell, to up and down while flowing in the disk A or the disk B, and simultaneously changes the direction by 90 degrees in the left and right directions. After being introduced through the upper portion of the trapezoidal diffuser cell of the disk A, that is, the upper end portion of the upper open cell a 111 that is open, the fluid diffuses along the side surface and collides with a bottom portion. At the same time, since the flow path is formed at the direction changing portion that overlaps the adjacent disk B, the direction of the fluid may rapidly change to the diffuser cell of the disk B so that the fluid may flow along the flow path that is significantly reduced. Then, after being introduced into the trapezoidal diffuser cell of the disk B, the fluid diffuses again along the side surface and is induced again into the direction change portion of the diffuser cell of the disk A, so that the flow path is rapidly reduced, and the fluid is introduced thereinto.

Specifically, as shown in FIG. 7, in the fluid pressure reducing device of the present invention, the fluid is introduced through the upper open cell a 111, changes the direction to the closed cell b-1 211, changes the direction back to the closed cell a-2 113, and changes the direction to the closed cell b-2 212. In this way, as the fluid is introduced and changes the direction, the fluid pressure is reduced due to resistance.

In particular, a portion where the diffuser cell of the disk A overlaps and crosses the diffuser cell of the disk B, that is, a direction changing portion W is provided close to the trapezoidal bottom surface with a narrow top and a wide bottom, and is preferably spaced apart from the bottom surface at a predetermined interval. Therefore, it is necessary to provide a predetermined separation space S between the trapezoidal bottom surface with the narrow top and the wide bottom and the direction changing portion W. Since the predetermined separation space S forms a recirculation flow with a strong vortex in a process of introducing the fluid into the direction changing portion W after colliding with the trapezoidal bottom surface, kinetic energy is greatly reduced.

FIG. 8 is a view showing an analysis of a flow path formed by concentrically coupling the disk A 100 to the disk B 200 and a flow of the fluid through a simulation. If the disk A 100 is an upper layer, the disk B 200 serves as a flow path of a lower layer, and the diffuser cell of the disk A 100 overlaps the diffuser cell of the disk B 200 to form a flow path of the upper and lower layers.

Specifically, the diffuser cell has a trapezoid shape with a narrow top and a wide bottom, which includes an upper surface, a lower surface, and inclined side surfaces. The fluid is introduced from the narrow upper portion of the trapezoid shape through the first port, diffuses along the enlarged side surface, and collides with the lower surface, and the collided fluid flows again toward the narrow direction changing portion W in which the diffuser cells of the disk A and the disk B overlap each other, and the flow thereof is rapidly reduced, thereby causing the direction changing flow. In addition, the recirculation flow is generated by the direction change flow, and thus the flow resistance of the fluid is maximized, thereby inducing the reduction in pressure and speed of the fluid by means of such effects.

In particular, the direction change flow moving to the lower disk or the upper disk through the direction changing portion W is generated, and the flow of the fluid is bent at a right angle again to increase the resistance of the fluid. In this way, the flow of the fluid repeatedly moves from the upper layer to the lower layer to change the direction in a zigzag manner, and finally, the fluid pressure and the flow velocity rapidly decrease through a diffusion flow 660 in the second port 510.

Specifically, the fluid introduced through the first port of a first cell causes a main flow 610 such as a linear flow, causes the direction change flow while leaning on the narrow direction changing portion W overlapping the second cell, and simultaneously, collides with the bottom portion to cause an energy loss, and then changes the direction to cause a first recirculation flow 620 in the separation space S, and is introduced into a first direction changing portion W. The fluid that has passed through the first direction changing portion W causes a recirculation flow (2-1) 630 from an upper portion of the second cell, causes a recirculation flow (2-2) 640 at a lower portion, and after colliding at the bottom portion, the fluid causes a recirculation flow (2-3) 650 in the separation space S and is introduced into a second direction changing portion W in which the second cell overlaps a third cell. The fluid that has passed through the second direction changing portion W causes the recirculation flow in the third cell again. As the recirculation flow is activated, a width of the main flow becomes narrower and the flow resistance becomes larger, and it can be seen that in the flow of the fluid, the fluid pressure and the flow velocity are significantly reduced by the rapid direction change flow.

The diffuser cells may be easily and rapidly manufactured on the disks by using a laser processing machine, a water jet processing machine, or the like, which are widely used in general. The disks manufactured in the same manner as described above may be stacked and coupled to each other by a method such as bolts, welding, or brazing to process a fluid pressure reducing device.

The fluid that diffuses and flows along a gradually widening side surface portion of the diffuser cell strongly collides at the bottom surface, and rapidly changes the direction from the direction change portion W to the diffuser cell of another stacked disk toward the upper layer or the lower layer. The rotation flow in which the fluid strongly rotates before entering the diffuser cell of the upper layer or the lower layer is generated, thereby causing strong convection and flow bias due to Reynolds stress, resulting in an increase in energy and pressure loss. The flow path formed by the diffuser a 110 and the diffuser b 210 has such flow characteristics, thereby forming an effective fluid pressure reducing device having large energy and pressure low loss per unit volume.

The energy loss and pressure reduction capacity by the diffuser cell may be expressed as $\zeta d = f(\alpha, n, Re)$. In the above expression, $\alpha$ is an angle of the diffusion angle of the diffuser cell, n is a ratio of a diffusion cross-sectional area of the diffuser, which is a ratio between an area of the upper surface and an area of the lower surface of the diffuser cell, and Re is a Reynolds number. The energy loss and pressure reduction capacity increase as $\alpha$, n, and Re increase, and the fluid pressure reducing device may be compactly manufactured by combining these three variables. As the angle $\alpha$ of the diffusion angle of the diffuser cell increases, the pressure reduction capacity of the fluid increases, but when the angle $\alpha$ reaches 45°, an increase rate thereof is significantly lowered. Therefore, the angle of the diffuser is preferably about 45° to 50°. As the ratio n of the diffusion cross-sectional area of the diffuser increases, the pressure reduction capacity of the fluid increases. In addition, as the Reynolds number Re increases, the pressure reduction capacity of the fluid increases, but when the Reynolds number Re is $4 \times 10^5$ or more, the pressure reduction capacity does not increase any more. Therefore, when the angle α of the diffusion angle of the diffuser, the ratio n of the diffusion cross-sectional area, and the Reynolds number (Re) are appropriately adjusted, the pressure reduction capacity increases in a given volume, thereby designing and manufacturing a compact fluid pressure reducing device. The fluid introduced into the fluid pressure reducing device sequentially passes through the diffuser cell several times, and the pressure of the fluid is reduced and the flow rate is a preset speed.

Figure 9:
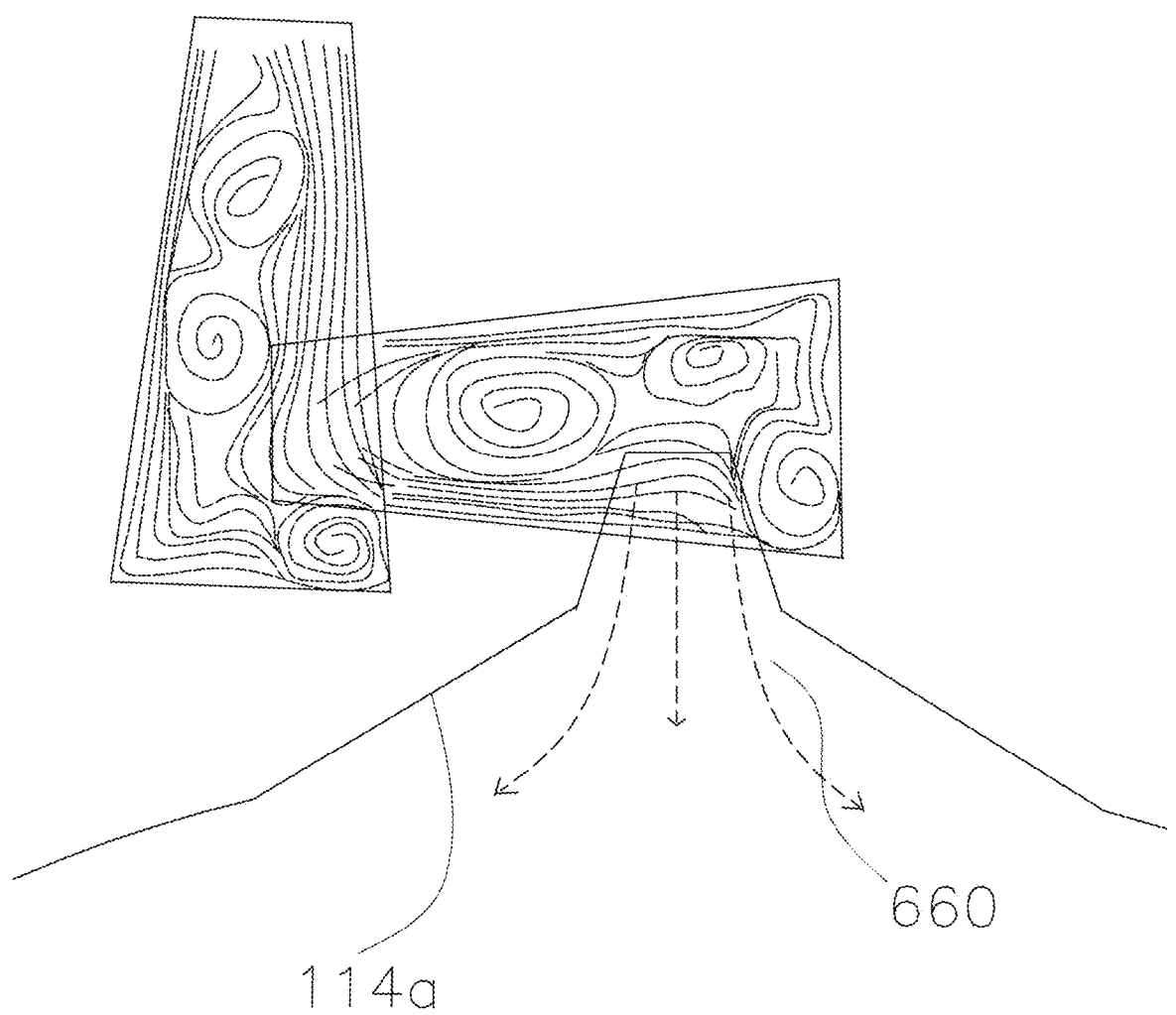
FIG. 9 is an enlarged view of a flow at an outlet according to the first embodiment of the present invention.

FIG. 9 shows a structure of the second port 510 of the diffuser cell provided in the fluid pressure reducing device, and an outflow in the second port 510. The second port 510 has a diffusion passage, in which a lower enlarged portion 114a is a part of the diffuser cell and forms the final second port 510 in the fluid pressure reducing device. A passage of the second port 510 is widened in a direction in which the fluid is diffused for diffusion. The flow velocity is obtained by dividing a flow rate by a cross-sectional area of the flow path, and is expressed as v=q/A. In the above expression, v is a flow velocity, A is a cross-sectional area of the flow path, and q is a flow rate. Therefore, kinetic energy at the second port 510 is $KE=\frac{1}{2}\times(\rho v^2/M)$. In the expression, KE is kinetic energy, ρ is a density of the fluid, v is a flow velocity, and M is a constant. Therefore, in order to lower the flow velocity at the same flow rate, the cross-sectional area of the flow path may be increased. As shown in FIG. 9, the second port 510 is implemented by a diffuser cell having a trapezoidal upper end and a lower end that is further enlarged than the upper end, and in order to increase the cross-sectional area of the diffuser cell, both sides thereof are enlarged from the lower end toward the outlet, thereby forming the lower enlarged portion 114a. As a result, the flow velocity, and the kinetic energy of the second port 510 may be significantly reduced to significantly reduce a collision force acting on the circumferential surface of the plug 13 that is located on the inner circumferential surface 500 of the fluid pressure reducing device, thereby preventing fatigue damage and erosion of the circumferential surface of the plug 13. Expanding the flow path by the lower enlarged portion 114a may significantly reduce the flow velocity and the kinetic energy at the second port 510.

Eventually, according to the fluid pressure reducing device of the present invention, by simultaneously and repeatedly performing the diffusion flow in which the fluid is diffused through the enlarged side surface of the diffuser cell in the pressure reduction flow path formed by each diffuser cell, the recirculation flow at the lower end part of the side surface, the collision flow with the bottom surface, the rotation flow generated thereafter, the rapid reduction to the direction changing portion W, and the rapid direction change to the upper layer or the lower layer, it is possible to significantly enhance an effect of reducing the pressure of the fluid. Specifically, when the flow of the fluid is diffused, the fluid is ejected due to flow separation, and the recirculation flow is generated at the side surface. This reduces the area of the main flow path and increases the speed of the main flow. As the diffusion angle increases, the maximum speed of the recirculation flow further increases. Increasing the speed of a region of the recirculation flow further increases an energy loss in the flow path, resulting in greater pressure loss. When the flow of the fluid collides with a wall surface and rapidly changes the direction, a strong secondary flow is generated, and the secondary flow causes strong convection and flow bias due to the Reynolds stress, resulting in a very complex phenomenon and a shear current. In addition, as the main flow collides with the wall surface, a rapid direction change generates a strong rotational motion, which increases energy and pressure loss due to an increase in the Reynolds stress. With such flow characteristics, a more effective structure of the fluid pressure reducing and diffusing device may be manufactured.

The fluid pressure reducing device of the present invention includes a fluid diffusing structure at the second port so as to so as to significantly reduce the pressure and speed of the fluid, and can reduce the impact when the fluid collides with the circumferential surface of the plug, thereby preventing erosion of the circumferential surface of the plug and precisely controlling opening/closing of the second port having the plug formed on the inner circumferential surface thereof.

Figure 10:
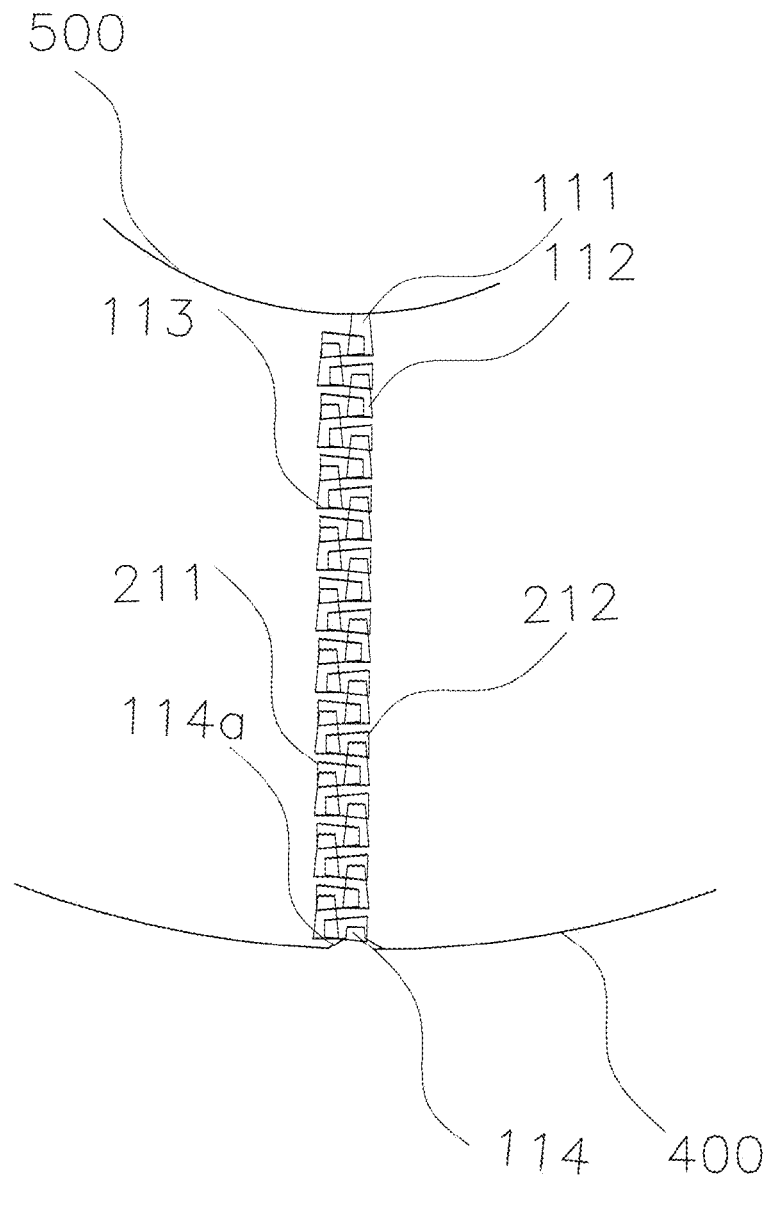
FIG. 10 is a view showing a diffuser structure formed on a disk A and a disk B according to a second embodiment of the present invention.

FIG. 10 relates to a second embodiment, in which diffusers are formed in the disks A and B such that the fluid may pass therethrough in a direction of the outer circumferential surface through the inner circumferential surface. According to the second embodiment of the present invention, the outer diameter is referred to as an outer circumferential surface 400, the inner diameter is referred to as an inner circumferential surface 500, and the direction toward the inner circumferential surface 500 is referred to as an upper portion or an upper direction. The direction toward the outer circumferential surface 400 is referred to as a lower portion or a lower direction.

That is, the diffuser a 110 of the disk A 100 including the plurality of diffuser cells includes:

an upper open cell a 111 provided adjacent to the inner circumferential surface 500 of the disk A 100 so as to form a first port 510 as an inlet of the fluid;

a lower open cell a 114 provided adjacent to the outer circumferential surface 400 of the disk A 100 so as to form a second port 410 as an outlet; and at least one closed cell 112 provided between the upper open cell a 111 and the lower open cell a 114, and wherein the upper open cell a 111, the closed cell 112, and the lower open cell a 114 are radially arranged in a row at predetermined intervals, so that a plurality of diffusers a 110 are formed in a circumferential direction with respect to the center of the disk A 100 while being spaced apart from each other at predetermined angles, wherein the diffuser b 210 of the disk B 200 including a plurality of diffuser cells, includes:

closed cells of trapezoidal shapes, which are provided in a direction from the inner circumferential surface 500 to the outer circumferential surface 400 of the disk B 200, are formed in a direction perpendicular to a radial direction in a row at predetermined intervals, and are arranged to be perpendicular to the diffuser cell of the disk A; and a plurality of closed cell b-1 211 and a plurality of closed cell b-2 212 having trapezoidal shapes, which are provided between the outer circumferential surface 400 and the inner circumferential surface 500 of the disk B 200, in which the closed cell b-1 211 and the closed cell b-2 212 are formed in a direction perpendicular to a direction in which the diffuser cell of the diffuser a 110 is formed, and directions of the trapezoidal shapes of the closed cell b-1 211 and the closed cell b-2 212 are sequentially reversed.

In such an embodiment, the same effect as described above may be obtained. In general, as described above, inducing the pressure reduction flow in the direction from the inner circumferential surface to the outer circumferential surface may be applied to gas flow. That is, a high-pressure gas is introduced through the first port of the inner circumferential surface, and is discharged through the second port while expanding through the pressure reduction flow path. Inducing the pressure reduction flow path in the direction of the outer circumferential surface through the inner circumferential surface is contrary to that described above, and the effect thereof is the same, so that a detailed description thereof will be omitted.

INDUSTRIAL AVAILABILITY

The present invention is mounted in a fluid treatment device such as a valve, and is used to convert a high-pressure fluid into a low-pressure fluid, which is industrially applicable.

The invention claimed is:

1. A fluid pressure reducing device that is mounted in a fluid treatment device including an inlet pipe (11a) through which a high-pressure fluid is introduced and an outlet pipe (11b) through which a low-pressure fluid is discharged, to induce fluid pressure reduction, the fluid pressure reducing device comprising:

an annular disk A (100) configured to have an outer diameter and an inner diameter; and an annular disk B (200) configured to have an outer diameter and an inner diameter, which are the same as the outer diameter and the inner diameter of the disk A, wherein the disk A (100) and the disk B (200) are concentrically coupled to each other as a pair of disks, wherein a plurality of diffuser cells having a trapezoidal shape of a narrow top and a wide bottom are formed from an outer circumferential surface (400) to an inner circumferential surface (500) so as to stand upright, so that a diffuser a (110) is radially formed in the disk A (100), a plurality of diffuser cells having a trapezoidal shape are formed from the outer circumferential surface (400) to the inner circumferential surface (500) of the disk B (200) so as to be perpendicular to a radial direction so that a diffuser b (210) is formed, the disk A (100) and the disk B (200) are concentrically coupled to each other so that the diffuser a (100) crosses the diffuser b (210), thereby forming a pressure reduction flow path, and a plurality of sets of the disk A and the disk B are integrally coupled to each other, wherein the diffuser a (110) of the disk A (100) includes: an upper open cell a (111) provided adjacent to the outer circumferential surface (400) of the disk A (100) and having a trapezoidal shape with a narrow upper end that is open so as to form a first port of the fluid;

a lower open cell a (114) provided adjacent to the inner circumferential surface (500) of the disk A (100) and having a trapezoidal shape with a wide lower end that is open so as to form a second port of the fluid; and a closed cell a-1 (112) and a closed cell a-2 (113) having a trapezoidal shape, which are provided in two rows between the upper open cell a (111) and the lower open cell a (114) at a predetermined interval, in which positions of a row of the closed cell a-2 (113) and a row of the closed cell a-1 (112) are offset from each other, wherein the diffuser b (210) of the disk B (200) includes a plurality of closed cell b-1 (211) and a plurality of closed cell b-2 (212) having trapezoidal shapes, which are provided between the outer circumferential surface (400) and the inner circumferential surface (500) of the disk B (200) and are formed in a direction from the outer circumferential surface to the inner circumferential surface at predetermined intervals, and wherein the closed cell b-1 (211) and the closed cell b-2 (212) are formed, in which a direction perpendicular to a direction in which the diffuser cells of the diffusers a (110) are formed to connect a flow path between the closed cell a-1 (112) and the closed cell a-2 (113), and wherein the trapezoidal shapes of the closed cell b-1 (211) and the closed cell b-2 (212) are alternately reversed such that widths thereof are gradually increased in a flow direction of the fluid, thereby allowing the fluid to repeat diffusion flow.

2. A fluid pressure reducing device that is mounted in a fluid treatment device including an inlet pipe (11a) through which a high-pressure fluid is introduced and an outlet pipe (11b) through which a low-pressure fluid is discharged, to induce fluid pressure reduction, the fluid pressure reducing device comprising:

an annular disk A (100) configured to have an outer diameter and an inner diameter; and an annular disk B (200) configured to have an outer diameter and an inner diameter, which are the same as the outer diameter and the inner diameter of the disk A, wherein the disk A (100) and the disk B (200) are concentrically coupled to each other as a pair of disks, wherein a plurality of diffuser cells having a trapezoidal shape of a narrow top and a wide bottom are formed from an inner circumferential surface (500) to an outer circumferential surface (400) so as to stand upright, so that a diffuser a (110) is radially formed in the disk A (100), a plurality of diffuser cells having trapezoidal shapes are formed from the inner circumferential surface (500) to the outer circumferential surface (400) so as to be perpendicular to a radial direction, so that a diffuser b (210) is formed in the disk B (200), and the disk A (100) and the disk B (200) are concentrically coupled to each other so that the diffuser a (110) crosses the diffuser b (210), thereby forming a pressure reduction flow path, and a plurality of sets of the disk A and the disk B are integrally coupled to each other, wherein the diffuser a (110) of the disk A (100) includes: an upper open cell a (111) provided adjacent to the inner circumferential surface (500) of the disk A (100) and having a trapezoidal shape with a narrow upper end that is open so as to form a first port (510) of the fluid;

a lower open cell a (114) provided adjacent to the outer circumferential surface (400) of the disk A (100) and having a trapezoidal shape with a wide lower end that is open so as to form a second port (410) of the fluid; and at least one closed cell a-1 (112) and a closed cell a-2 (113) having a trapezoidal shape, which are provided in two rows between the upper open cell a (111) and the lower open cell a (114) at a predetermined interval, in which positions of a row of the closed cell a-2 (113) and a row of the closed cell a-1 (112) are offset from each other, wherein the diffuser b (210) of the disk B (200) including the plurality of diffuser cells have a plurality of closed cell b-1 and a plurality of closed cell b-2 having trapezoidal shapes, which are provided between the outer circumferential surface (400) and the inner circumferential surface (500) of the disk B (200) and are formed in a direction from the inner circumferential surface to the outer circumferential surface at predetermined intervals, wherein the closed cell b-1 (211) and the closed cell b-2 (212) are formed, in which a direction perpendicular to a direction in which the diffuser cells of the diffuser a (110) are formed to connect a flow path between the closed cell a-1 (112) and the closed cell a-2 (113), and wherein the trapezoidal shapes of the closed cell b-1 (211) and the closed cell b-2 (212) are alternately reversed such that widths thereof are gradually increased in a flow direction of the fluid, thereby allowing the fluid to repeat diffusion flow.

3. The fluid pressure reducing device of claim 2, wherein the lower open cell a (114) having the trapezoidal shape with the lower end that is open is provided with a lower enlarged portion (114*a*) enlarged toward the second ports (410, 510).

4. The fluid pressure reducing device of claim 1, wherein the lower open cell a (114) having the trapezoidal shape with the lower end that is open is provided with a lower enlarged portion (114*a*) enlarged toward the second ports (410, 510).

* * * * *